United States Patent
Lee et al.

(10) Patent No.: US 9,734,582 B2
(45) Date of Patent: Aug. 15, 2017

(54) REMOTE POINTING METHOD

(71) Applicant: LG ELECTRONICS INC., Seoul (KR)

(72) Inventors: Kamin Lee, Seoul (KR); Sungjin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 3 days.

(21) Appl. No.: 14/769,562

(22) PCT Filed: Feb. 21, 2013

(86) PCT No.: PCT/KR2013/001392
§ 371 (c)(1),
(2) Date: Aug. 21, 2015

(87) PCT Pub. No.: WO2014/129683
PCT Pub. Date: Aug. 28, 2014

(65) Prior Publication Data
US 2016/0005173 A1 Jan. 7, 2016

(51) Int. Cl.
| | |
|---|---|
| *G06K 9/00* | (2006.01) |
| *G06T 7/00* | (2017.01) |
| *G06F 3/00* | (2006.01) |
| *G06F 3/01* | (2006.01) |
| *H04N 21/4223* | (2011.01) |

(Continued)

(52) U.S. Cl.
CPC .......... *G06T 7/0042* (2013.01); *G01B 11/245* (2013.01); *G06F 3/005* (2013.01); *G06F 3/017* (2013.01); *G06T 7/73* (2017.01); *H04N 13/0271* (2013.01); *H04N 21/4223* (2013.01); *G06T 2207/10021* (2013.01); *G06T 2207/10028* (2013.01); *G06T 2207/30196* (2013.01);

(Continued)

(58) Field of Classification Search
CPC .......... G06F 3/017; G06F 3/011; G06F 3/005; G06F 3/0425; G06K 9/00335; G06K 9/00375; G06K 9/00355; G06K 9/00362; G06K 9/00389; G06T 2207/10028
See application file for complete search history.

(56) References Cited

U.S. PATENT DOCUMENTS

| | | | |
|---|---|---|---|
| 9,465,444 B1 * | 10/2016 | Ramaswamy | .......... G06F 3/017 |
| 2001/0043719 A1 | 11/2001 | Harakawa et al. | |

(Continued)

FOREIGN PATENT DOCUMENTS

| | | |
|---|---|---|
| JP | 2004-265222 A | 9/2004 |
| KR | 10-2009-0048197 A | 5/2009 |
| KR | 10-2011-0099176 A | 9/2011 |

OTHER PUBLICATIONS

International Search Report dated Nov. 6, 2013 issued in Application No. PCT/KR2013/001392.

*Primary Examiner* — Jonathan S Lee
(74) *Attorney, Agent, or Firm* — KED & Associates, LLP

(57) ABSTRACT

The present invention relates to a remote point method. A remote pointing method according to the present invention comprises capturing images by a first and a second camera disposed being separated spatially from each other; detecting a pointing part in a first image captured by the first camera; determining a region of interest including the pointing part in a second image captured by the second camera; and extracting stereoscopic coordinates of the pointing part within the region of interest.

4 Claims, 17 Drawing Sheets

(51) Int. Cl.

| | | |
|---|---|---|
| *H04N 13/02* | (2006.01) | |
| *G01B 11/245* | (2006.01) | |
| *G06T 7/73* | (2017.01) | |
| *H04N 13/00* | (2006.01) | |

(52) U.S. Cl.
CPC .............. *G06T 2207/30241* (2013.01); *H04N 2013/0081* (2013.01); *H04N 2013/0085* (2013.01)

(56) References Cited

U.S. PATENT DOCUMENTS

| | | | | |
|---|---|---|---|---|
| 2003/0156756 | A1* | 8/2003 | Gokturk | G06F 3/017 382/190 |
| 2010/0194741 | A1* | 8/2010 | Finocchio | G06T 7/2066 345/419 |
| 2010/0289826 | A1* | 11/2010 | Park | G06F 3/04883 345/676 |
| 2010/0329511 | A1* | 12/2010 | Yoon | G06K 9/00382 382/103 |
| 2011/0083106 | A1* | 4/2011 | Hamagishi | G06F 3/017 715/836 |
| 2011/0298698 | A1 | 12/2011 | Lou et al. | |
| 2012/0134536 | A1* | 5/2012 | Myokan | G06K 9/00355 382/103 |
| 2012/0200494 | A1* | 8/2012 | Perski | G06F 3/017 345/156 |
| 2012/0319945 | A1* | 12/2012 | McCarthy | G06F 3/017 345/156 |
| 2013/0120250 | A1* | 5/2013 | Lin | G06F 3/011 345/157 |
| 2013/0293679 | A1* | 11/2013 | Gurman | G06K 9/00362 348/46 |
| 2013/0295539 | A1* | 11/2013 | Wilson | H04N 9/3147 434/247 |
| 2013/0343606 | A1* | 12/2013 | Dal Mutto | G06K 9/00355 382/103 |
| 2014/0009384 | A1* | 1/2014 | Valik | G06F 3/0304 345/156 |
| 2014/0104168 | A1* | 4/2014 | Hegde | G06F 3/017 345/157 |
| 2014/0177909 | A1* | 6/2014 | Lin | G06K 9/00355 382/103 |
| 2014/0184496 | A1* | 7/2014 | Gribetz | G02B 27/017 345/156 |
| 2014/0292723 | A1* | 10/2014 | Suzuki | G06F 3/04883 345/175 |
| 2014/0375547 | A1* | 12/2014 | Katz | G06F 3/017 345/156 |
| 2015/0116353 | A1* | 4/2015 | Miura | G06T 11/60 345/632 |
| 2016/0124513 | A1* | 5/2016 | Dal Zot | G06F 3/011 715/863 |

* cited by examiner

FIG. 4
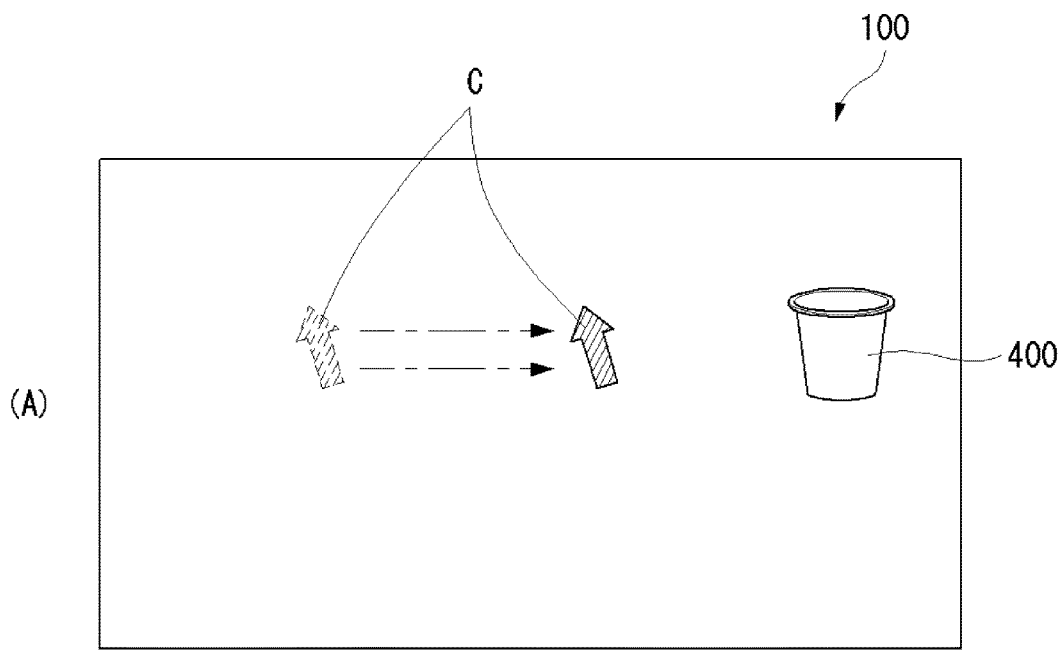
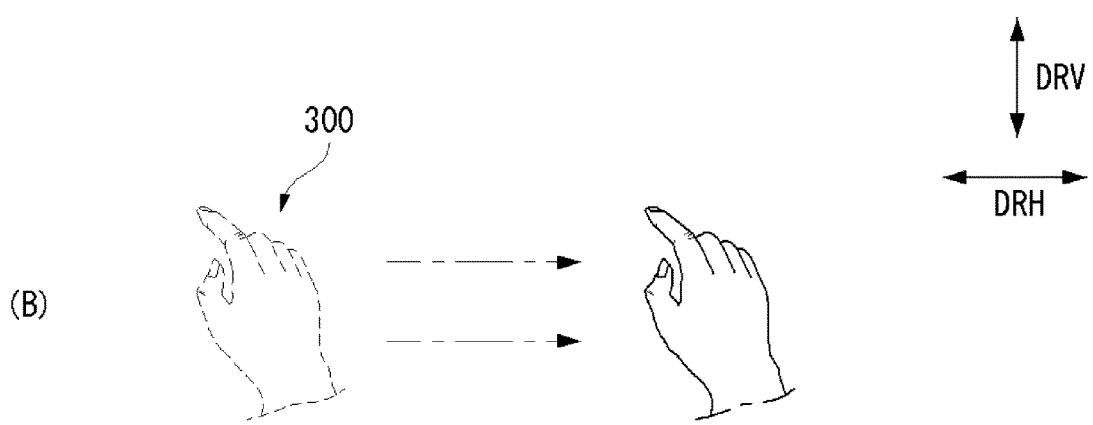

FIG. 5
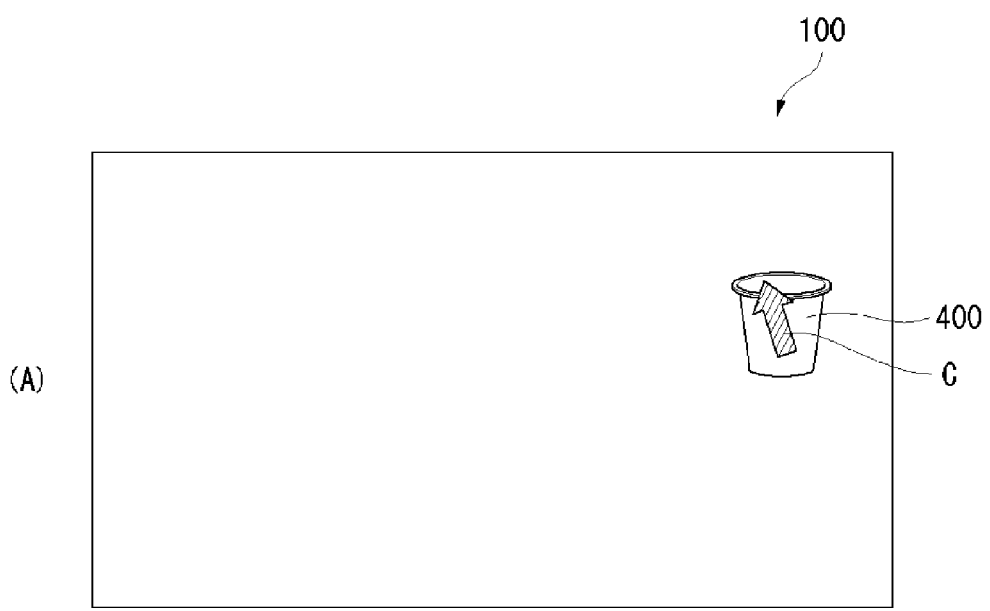
(A)
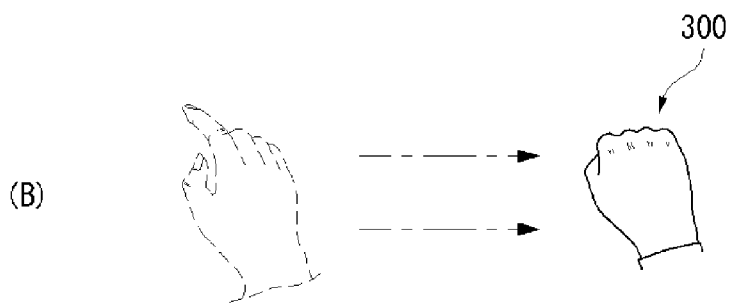
(B)

FIG. 12
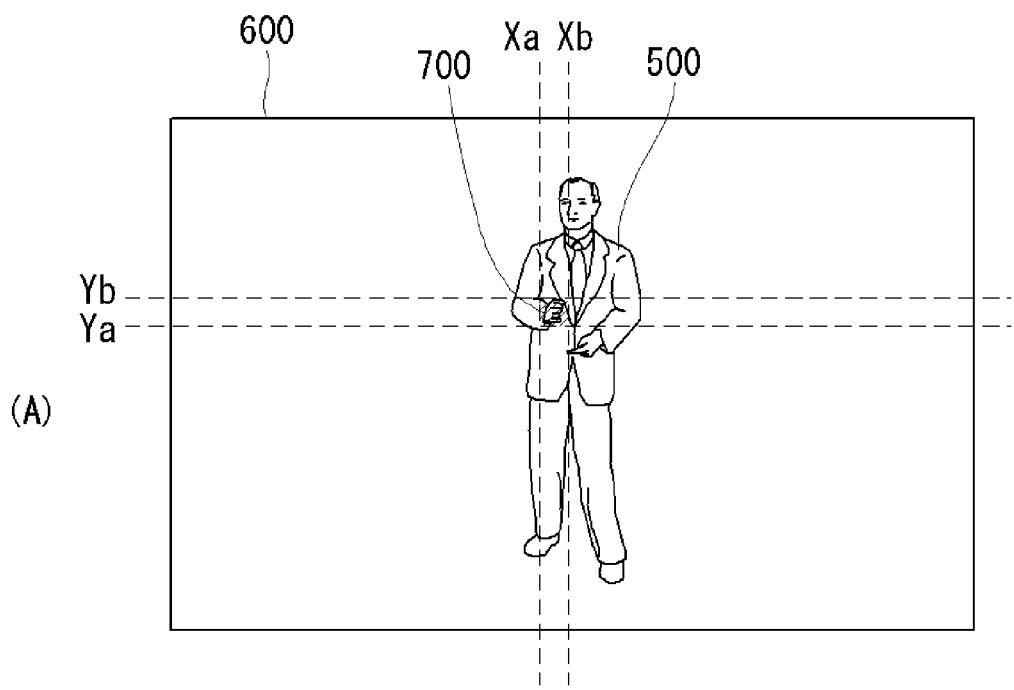
(A)
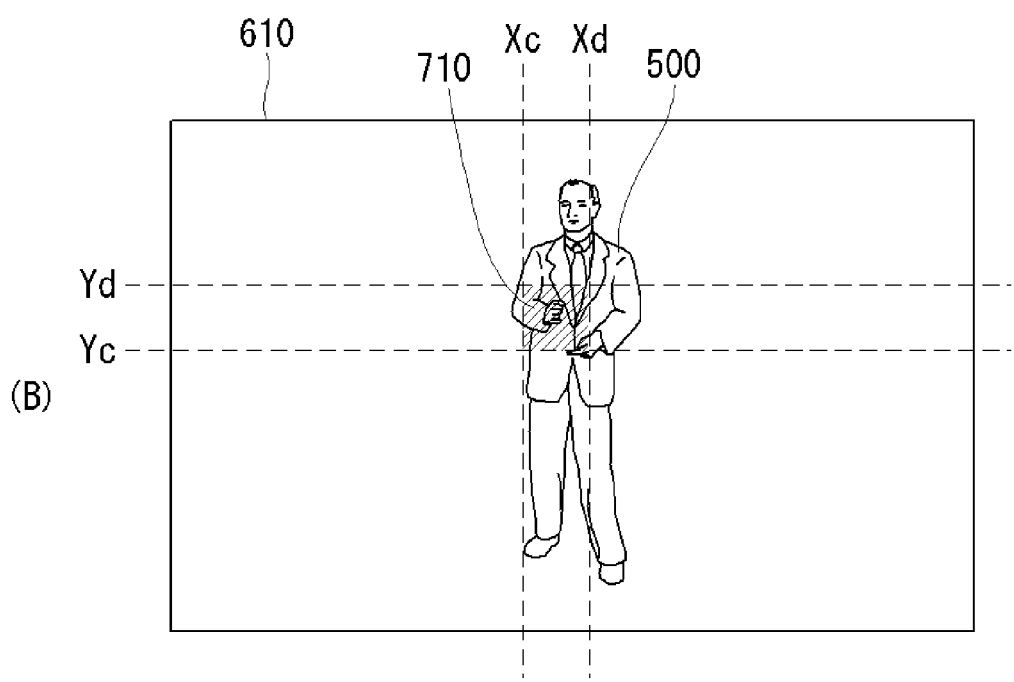
(B)

FIG. 13
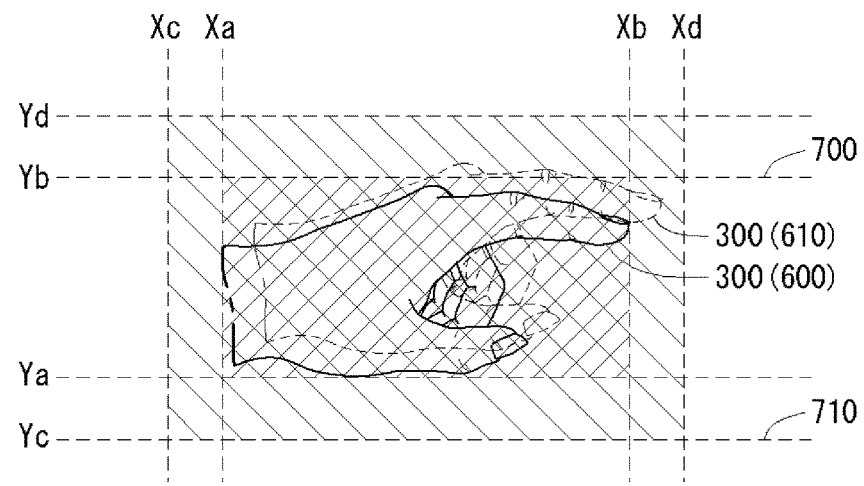
FIG. 14
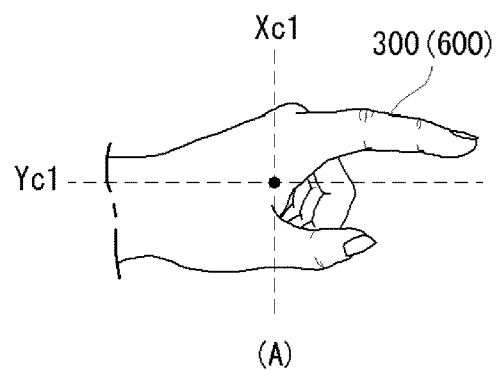
(A)
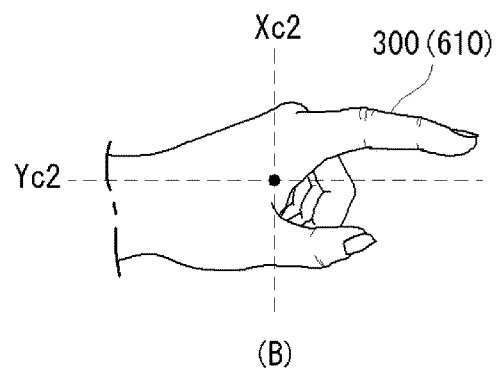
(B)

(A)  (B)

FIG. 20
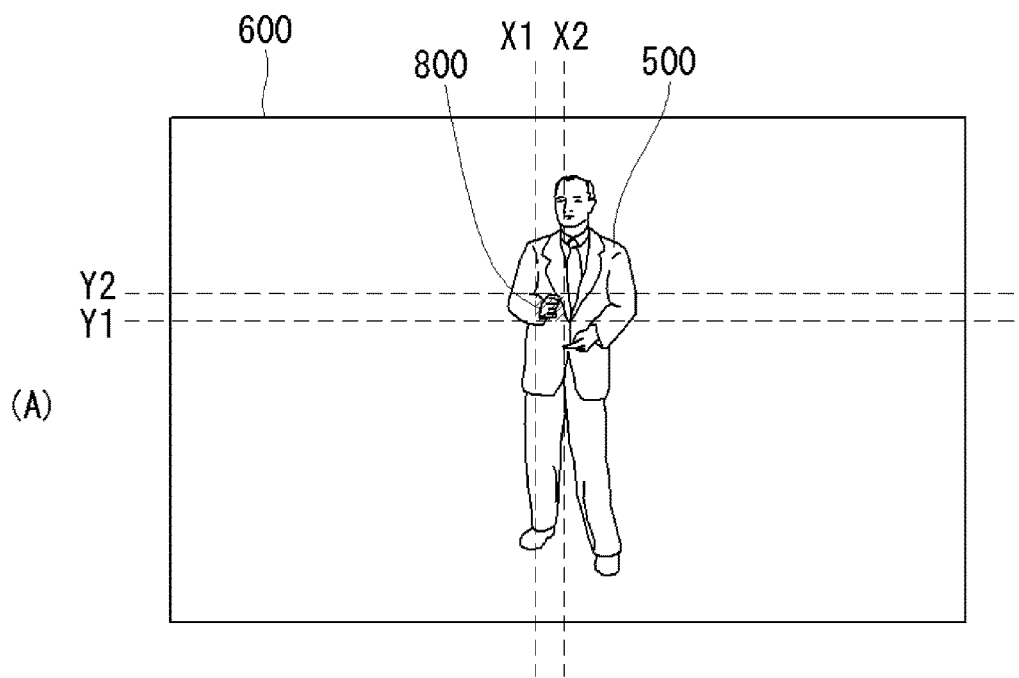
(A)
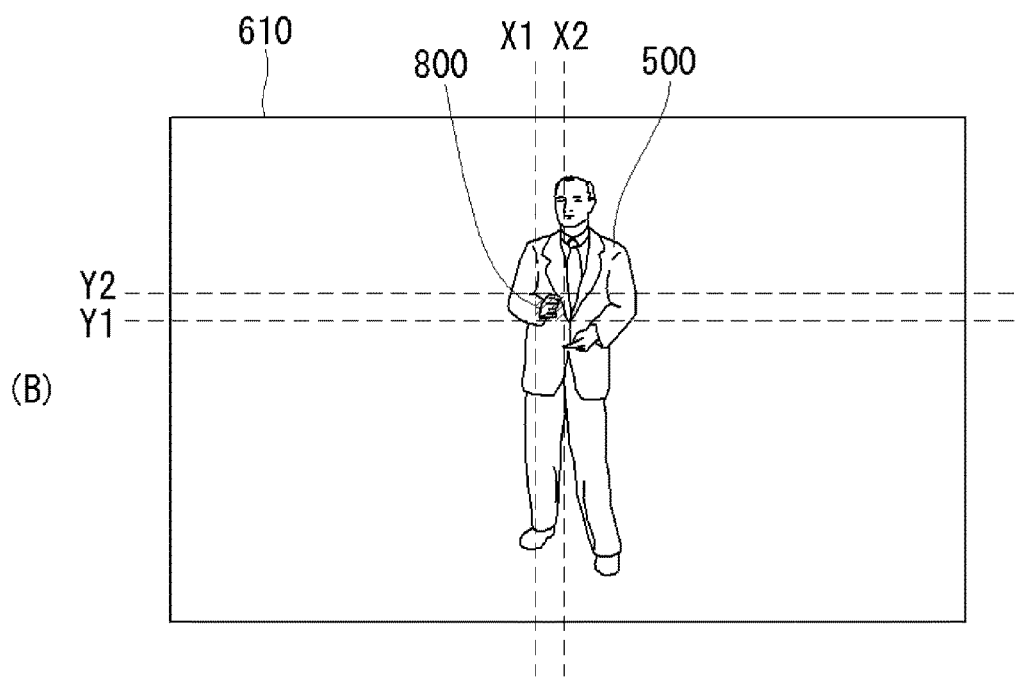
(B)

REMOTE POINTING METHOD

CROSS-REFERENCE TO RELATED PATENT APPLICATION

This application is a U.S. National Stage Application under 35 U.S.C. §371 of PCT Application No. PCT/KR2013/001392, filed Feb. 21, 2013, whose entire disclosure is hereby incorporated by reference.

TECHNICAL FIELD

The present invention is related to a remote pointing method.

BACKGROUND ART

Display devices such as broadcasting signal receivers (e.g., television) equipped with a network function receiving a data stream according to a real-time streaming scheme through a network such as the Internet, decoding the received data stream into an audio and a video signal, and processing the audio and the video signal are now widely used.

Display devices can carry out such functions as selecting a predetermined object displayed on a screen according to a user's gesture and moving a pointer. The aforementioned method can be called a remote pointing method.

Remote pointing methods used in the conventional display devices pose a problem that a computational process for detecting a user's gesture is complicated.

DISCLOSURE

Technical Problem

The present invention has been made in an effort to provide a remote pointing method simplifying a computational process for detecting a user's gesture.

Technical Solution

A remote pointing method according to the present invention comprises capturing images by a first and a second camera disposed being separated spatially from each other; detecting a pointing part in a first image captured by the first camera; determining a region of interest including the pointing part in a second image captured by the second camera; and extracting stereoscopic coordinates of the pointing part within the region of interest.

The remote pointing method can further comprise tracking a movement trajectory of the pointing part by using the stereoscopic coordinates.

The detecting the pointing part further comprises detecting first plane coordinates of the pointing part in the first image, and the determining a region of interest can further comprise extracting second plane coordinates of the pointing part.

The extracting stereoscopic coordinates can detect the stereoscopic coordinates by using a disparity between the first plane coordinates and the second plane coordinates.

The first plane coordinates include coordinates of a first central point of the pointing part in the first image; the second plane coordinates include coordinates of a second central point of the pointing part; and the detecting stereoscopic coordinates detects stereoscopic coordinates about the central point of the pointing part by using a disparity between the first central coordinates and the second central coordinates.

The size of the region of interest in the second image can be larger than the size of the region occupied by the pointing part in the first image.

Another remote pointing method according to the present invention comprises capturing images by a first and a second camera disposed being separated spatially from each other; determining a first region of interest including a pointing part in a first image captured by the first camera; determining a second region of interest including the pointing part in a second image captured by the second camera and corresponding to the first region of interest; extracting a depth map by using the first and the second region of interest; and tracking a movement trajectory of the pointing part in the depth map.

The size of the first region of interest can be the same as the size of the second region of interest.

Advantageous Effects

The present invention simplifies a computational process for detecting a user's gesture, thereby simplifying the structure of a driver and reducing manufacturing costs.

Furthermore, a remote pointing method according to the present invention can reduce resources required for detecting a user's gesture.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIGS. 3 to 6 illustrate motion commands; and

FIGS. 7 to 21 illustrate a method for detecting a motion command in detail.

BEST MODE

The technical object, characteristics, and advantages of the present invention will now be more clearly understood from detailed descriptions given below. In what follows, preferred embodiments according to the present invention will be given with reference to appended drawings. Throughout the document, the same reference number represents the same component. In the following description, if it is decided that the detailed description of known function or configuration related to the invention obscures the technical principles of the present invention, the corresponding description is omitted.

In what follows, a mobile terminal according to the present invention will be described in more detail with reference to appended drawings. A suffix such as "module" and "unit" may be assigned or used interchangeably to refer to elements or components. Use of such a suffix herein is merely intended to facilitate description of the specification, and the suffix itself is not intended to give any special meaning or function.

The broadcasting signal receiver described in this document as one example of a display device is a kind of intelligent image display device which adds a computer-supporting function to the broadcasting signal receiving function. As a function related to utilizing the Internet is supported in addition to the original broadcasting signal receiving function, more user-friendly interfaces such as a manual-type input device, a touch screen, and a spatial remote controller can be implemented. And thanks to the wired or wireless Internet capability, the broadcasting signal receiver can connect to the Internet or a computer to carry out functions for e-mail, web-browsing, banking, or game. To implement various functions above, a standard general-purpose OS can be used.

Therefore, the broadcasting signal receiver according to the present invention allows various applications to be added or removed freely, for example, on a general-purpose OS kernel, which enables various user-friendly functions to be carried out. Examples of the broadcasting signal receiver can include a network TV, HBBTV, and smart TV; depending on the situation, the broadcasting signal receiver can also be realized in a smart phone.

In what follows, a broadcasting signal receiver is described as an example of a display device to which the present invention is applied. In what follows, a broadcasting signal receiver can be interpreted as a display device.

Figure 1:
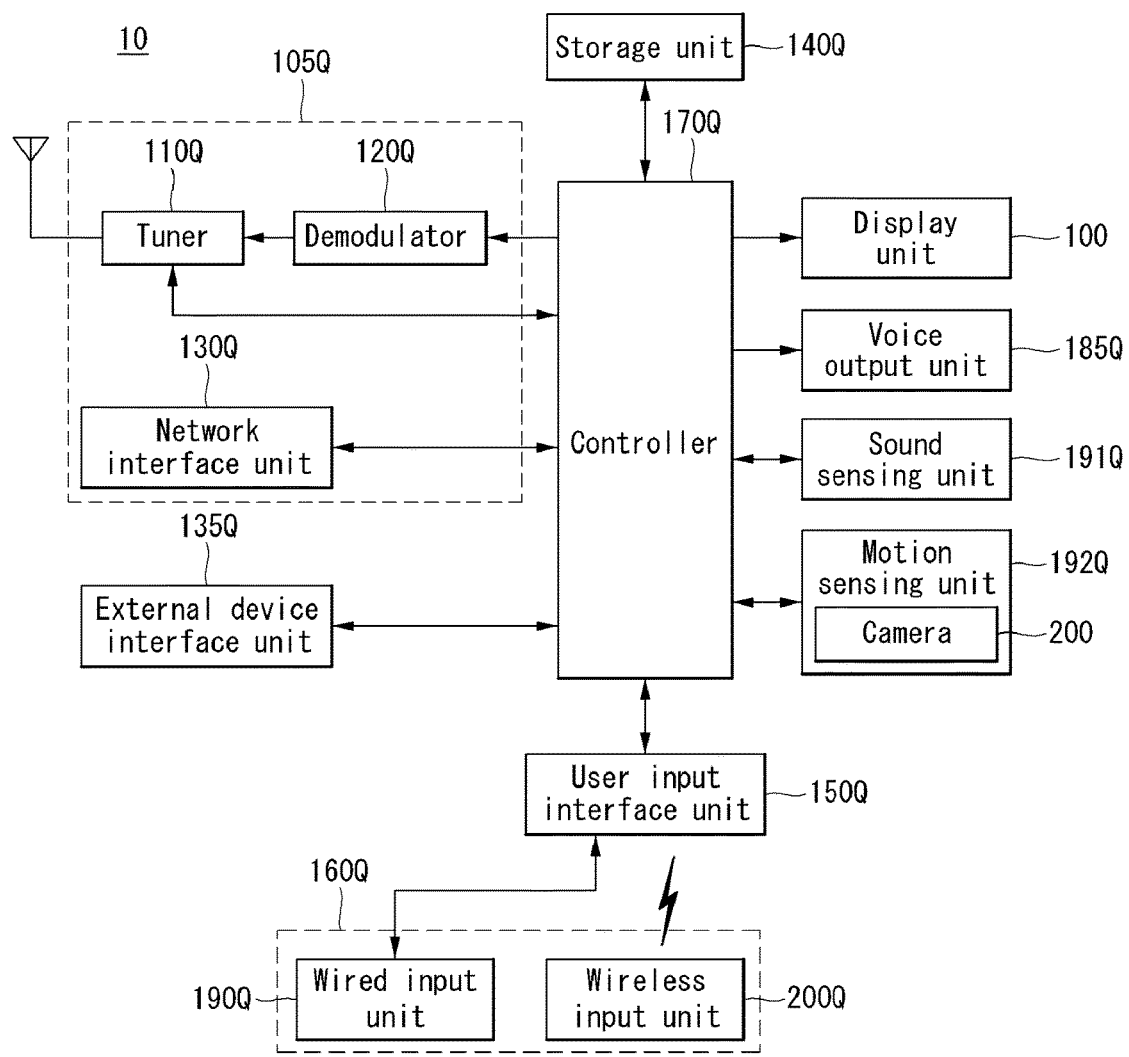
FIG. 1 illustrates a structure of a display device to which a remote pointing method according to the present invention is applied.

FIG. 1 illustrates a structure of a display device to which a remote pointing method according to the present invention is applied.

With reference to FIG. 1, a display device 10 comprises a display unit 100, a receiver 105Q, an external device interfacing unit 135Q, a storage unit 140Q, a user input interface unit 150Q, a controller 170Q, and a command input unit 160Q.

The display unit 100 can be regarded as a display panel.

Furthermore, the display device 10 according to the present invention can comprise a voice output unit 185Q for outputting a voice, a sound sensing unit 191Q for sensing a voice, and a motion sensing unit 192Q for sensing a user's motion.

A display device 10 according to the present invention will be described in more detail below.

A receiver 105Q comprises a tuner 110Q, a demodulator 120Q, and a network interface unit 130Q. Depending on the needs, it is possible to design the receiver 105Q not to include the network interface unit 130Q while incorporating the tuner 110Q and the demodulator 120Q; on the other hand, it is also possible to design the receiver 105Q not to include the tuner 110Q and the demodulator 120Q while incorporating the network interface unit 130Q.

The tuner 110Q selects a channel chosen by the user or Radio Frequency (RF) broadcasting signals corresponding to all of the preset channels among RF broadcasting signals received through an antenna. Also, the tuner 110Q converts the chosen RF broadcasting signal to an intermediate frequency signal, a baseband video signal, or a voice signal.

The demodulator 120Q receives a digital IF signal (DIF) converted by the tuner 110Q and demodulates the received DIF.

The demodulator 120Q can output a stream signal TS after carrying out demodulation and channel decoding. At this time, the stream signal can be a signal multiplexing a video signal, a voice signal, or a data signal.

The stream signal output from the demodulator 120Q can be input to the controller 170Q.

The controller 170Q carries out demultiplexing and video/voice signal processing, displays video on the display unit 100, and outputs a voice through the voice output unit 185Q.

The external device interface unit 135Q can connect an external device to the display device 10 of the present invention. To this purpose, the external device interface unit 135Q can include an A/V input and output unit (not shown) or a wireless communication unit (not shown).

The network interface unit 130Q provides an interface for connecting the display unit 10 to a wired/wireless network including the Internet.

The network interface unit 130Q can transmit and receive data to and from another user or another electronic device through a connected network or another network linked to the connected network.

The storage unit 140Q can store a program for processing and controlling various signals within the controller 170Q or store a signal-processed video, audio, or data signal.

The display unit 10 can play a contents file (a video file, a still image file, a music file, a document file, an application file, and so on) stored in the storage unit 140Q and provide contents to the user.

The command input unit 160Q can include an input key for receiving a user's command. The command input unit 160Q can comprise a wired input unit 190Q for receiving a command in a wired manner and a wireless input unit 200Q for receiving a command wirelessly.

Through the command input unit 160Q, the user can input various commands such as power on/off, channel selection, display setting, volume control, movement of a cursor or a pointer on a screen, and menu selection.

At this time, a wireless input unit 200Q can be a remote controller.

The user input interface unit 150Q can deliver a signal that the user provides through the command input unit 160Q to the controller 170Q or deliver a signal from the controller 170Q to the command input unit 160Q.

The controller 170Q can demultiplex streams input through the tuner 110Q, the demodulator 120Q, or the external device interface unit 135Q; or process demultiplexed signals to generate and output a video or a voice signal.

The video signal processed in the controller 170Q is fed to the display unit 100 to be displayed as a video according to the video signal. Also, the video signal processed in the controller 170Q can be input to an external display device through the external device interface unit 135.

The voice signal processed in the controller 170Q can be output to the voice output unit 185Q. Also, the voice signal processed in the controller 170Q can be input to an external output device through the external device interface unit 135Q.

Moreover, the controller 170Q can control the overall operation within the display device. For example, the controller 170Q controls the tuner 110Q to tune to an RF broadcasting program corresponding to the channel selected by the user or a preset channel.

Also, the controller 170Q can control the display device 10 by using a user command or an internal program received through the user input interface unit 150Q.

The controller 170Q can control the display unit 100 to display images.

The controller 170Q can control playing contents. The contents in this case may correspond to the contents stored within the display unit 10, received broadcasting contents, or contents input from the outside. The contents can be at least one of a broadcasting image, an externally input image, an audio file, a still image, a web page accessed, and a document file.

The display unit 100 converts an image signal, a data signal, and an OSD signal processed in the controller 170Q; or an image signal, a data signal, and so on received from the external device interface unit 135Q to the respective RGB signals and generates a driving signal.

The display unit 100 can employ PDP, LCD, OLED, flexible display, 3D display, and so on.

Meanwhile, the display unit 100 can be composed of a touch screen, thereby also being used as an input device in addition to being used as an output device.

The voice output unit 185Q receives a voice-processed signal from the controller 170Q, for example, a stereo signal, a 3.1 channel signal, or a 5.1 channel signal; and outputs the received voice-processed signal as a voice. The voice output unit 185Q can be implemented by various forms of speakers.

The sound sensing unit 191Q can sense a sound generated inside or outside the display device 10.

For example, the sound sensing unit 191Q can sense various kinds of sounds generated from the outside, such as a telephone ring sound, a doorbell sound, a sound of water, and a user's voice. To this purpose, the sound sensing unit 191Q can include a voice sensor or a microphone.

The motion sensing unit 192Q can sense the motion of a user. To this purpose, the motion sensing unit 192Q can include a sensor unit (not shown) equipped with at least one of a touch sensor, a voice sensor, a position sensor, and a motion sensor. The signal sensed by the sensing unit can be delivered to the controller 170Q.

Moreover, the motion sensing unit 192Q can include a camera 200. The image information captured by the camera 200 can be input to the controller 170Q.

Or the motion sensing unit 192Q can include the sensor unit and the camera 200 together.

The controller 170Q may detect the user's gesture by using the image captured by the camera 200 or a signal sensed by the sensing unit (not shown) separately or through a combination thereof.

To be more specific, the motion sensing unit 192Q can sense the motion of a predetermined pointing part of the user's body according to the control of the controller 170Q.

Moreover, the controller 170Q can move the pointer displayed on the display unit 100, select an object displayed on the display unit 100, or carry out a predetermined function according to the motion of the pointing part.

Furthermore, the motion sensing unit 192Q can also sense such information as the shape of the user's face and a viewing direction of the user's face as well as the user's motion.

Though not shown in this document, the camera 200 can comprise multiple cameras. Multiple cameras can be configured to operate as a stereo camera.

In what follows, how multiples cameras are used will be described in more detail.

Figure 2:
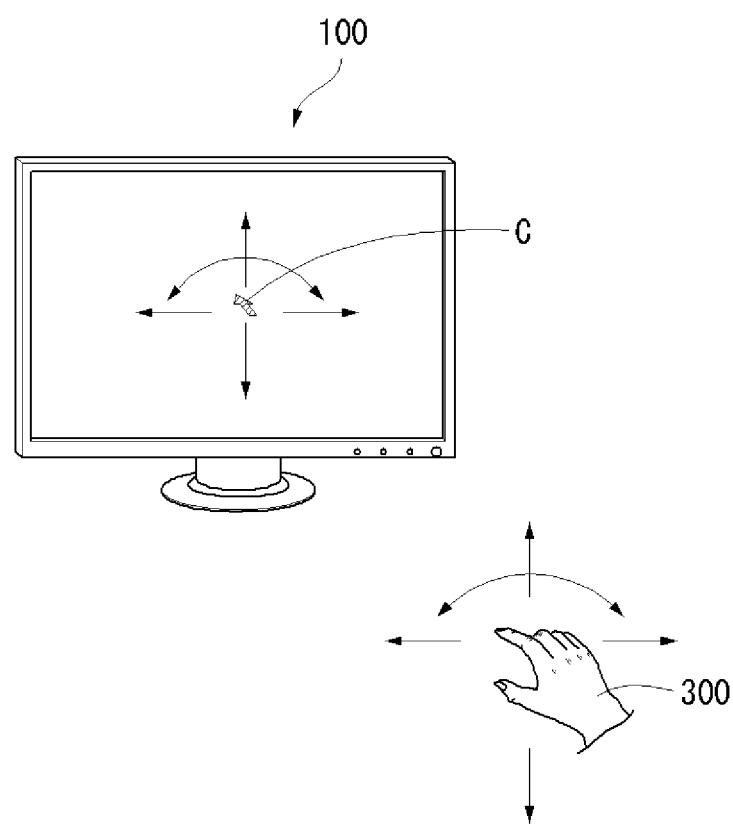
FIG. 2 illustrates a motion of a pointing part of a user and a control method according to the motion.

FIG. 2 illustrates a motion of a pointing part of a user and a control method according to the motion. In what follows, those descriptions given above will not be repeated.

FIG. 2 illustrates an example where the user inputs a motion command by using his/her hand 300. In other words, in the example of FIG. 2, the user's hand 300 is set as a pointing part. The present invention is not limited to the aforementioned example, however; the present invention can also include a case where the user gives a motion command by using other body part such as the user's arm or leg.

Also, the pointing part according to the present invention can be the wireless input unit 200Q.

With reference to FIG. 2, if the user moves his/her hand up and down, side to side, the pointer C displayed on the display unit 100 can move up and down, side to side in accordance to the movement of the user's hand 300.

Moreover, if the user rotates the hand 300, the pointer C displayed on the display unit 100 can also rotate accordingly.

If the user makes a predetermined motion, the motion sensing unit 192Q can detect the motion. The motion sensing unit 192Q can use a camera to detect the motion of the user.

The information about the motion of the user's hand sensed by the motion sensing unit 192Q is sent to the controller 170Q of the display unit 10.

The controller 170Q can calculate coordinates of the position at which to display the pointer C from the information about the motion of the user's hand 300. Moreover, the display unit 100 of the display device 10 can display the pointer C so that the pointer C corresponds to the coordinates calculated by the controller 170Q.

As described above, even for the case where the user controls the display device 10 by using his/her motion rather than a remote control device such as the wireless input unit 200Q, a selected region within the display unit 100 corresponding to the pointer C can be zoomed in to be viewed bigger and closer or zoomed out to be viewed smaller and further away in accordance with the user's particular motion.

Moreover, it is possible to move the pointer C displayed on the display unit 100 or select an object displayed on the display unit 100 according to the user's motion; it is still possible to select a predetermined key from an input menu displayed on the display unit 100.

FIGS. 3 to 6 illustrate motion commands. In what follows, descriptions about those parts already described above will be omitted. For example, it is preferable to regard that the motion sensing unit 192Q described above senses the motion of a pointing part described below.

Furthermore, though the following descriptions are based on an assumption that a motion command corresponds to the user's body motion, namely, gesture, the motion command can also be generated by the motion of other object such as the wireless input unit 200Q and a rod.

Figure 3:
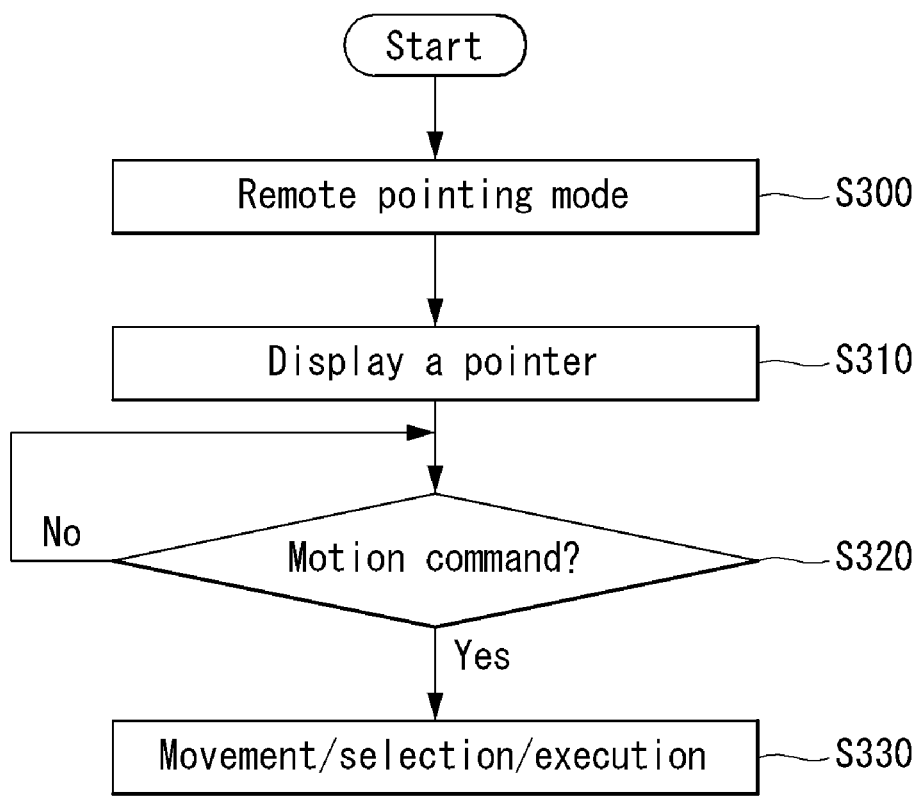

Referring to FIG. 3, when the display device 10 enters a remote pointing mode S300, the display device 10 can display a pointer C on the display unit 100, S310.

A remote key input mode can be set when the user directly enters a command through an input means such as the wireless input unit 200Q commanding entrance to the remote pointing mode. Similarly, the remote pointing mode can be set by the user's motion command.

Setting the remote pointing mode can also be done when the user selects a predetermined icon or an object displayed on the display unit 100. The present invention is not limited to the cases above, and the method for setting the remote pointing mode can be changed in various ways.

While the pointer C is displayed on the display unit 100, whether a motion command is received can be checked S320.

From the checking result, if it is determined that a motion command has been input, the pointer C can be moved on the display unit 100 according to the motion command, a predetermined object displayed on the display unit 100 is selected, or a predetermined function is carried out S330.

At this time, the motion command is regarded as being received when a predetermined pointing part among the user's body moves according to a predetermined pattern in the remote pointing mode.

For example, as shown in FIG. 4(B), if the user's hand 300 moves along a horizontal direction (DRH), more specifically, from left to right, the pointer C displayed on the display unit 100 moves from left to right in accordance with the movement of the user's hand 300 as shown in FIG. 4(A).

The example of FIG. 4 corresponds to the case where the user's hand 300 is configured as the pointing part.

As shown in FIG. 4, movement of the user's hand 300 can correspond to the motion command for moving the pointer C.

The example of FIG. 4 is based on an assumption that the user's hand 300, namely, the pointing port moves along a horizontal direction; however, the present invention is not limited to the assumption. For example, in case the hand 300 moves along a vertical direction (DRV), the pointer 300 can move along a vertical direction (DRV) on the display unit 100.

Moreover, in case the user's hand 300 rotates or moves along a diagonal direction, too, it is regarded that a motion command has been received, and the pointer C can be rotated or moved along a diagonal direction on the display unit 100.

A motion command following a pattern different from FIG. 4 will be described with reference to FIG. 5.

If the index finger of the user's hand 300 is folded while the index finger is stretched as shown in FIG. 5(B), an object 400 corresponding to the pointer C from among the objects displayed on the display unit 100 can be selected as shown in FIG. 5(A). Similarly, it is also possible to carry out a predetermined function corresponding to the object 400. Or registration information corresponding to the object 400 can be displayed on the display unit 100.

In this way, if the user performs a folding motion while the user's index finger is stretched, a function such as selecting the pointer C corresponding to the object 400 is possible. In this case, the movement of the user's index finger can correspond to a motion command.

The example of FIG. 5 corresponds to the case where the user's hand 300 is set as the pointing part or the index finger of the user's hand 300 is set as the pointing part.

In the examples of FIGS. 4 and 5, motion commands are generated as the user folds his/her index finger or the user moves his/her hand 300, but the present invention is not limited to the examples above.

For example, though not shown, in case the user moves his/her hand along a predetermined direction with the palm unfolded, a motion command corresponding to a function of moving the pointer C can be generated.

Figure 6:
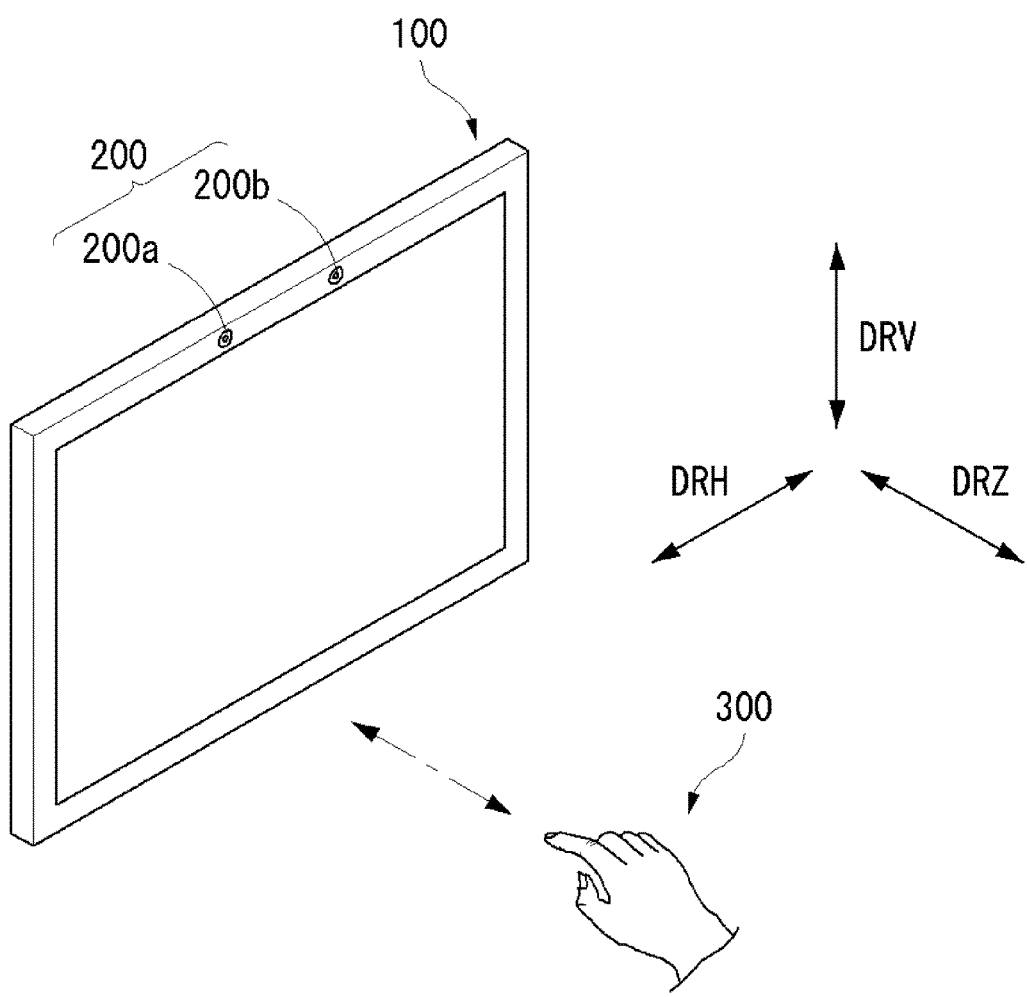

Also, a motion command corresponding to the function of selecting a predetermined object when the user opens and closes his/her hand, Also, as shown in FIG. 6, a motion command can be input when the distance between the pointing part (hand 300) and the display unit 100 is changed.

For example, in case the user's hand 300 is set as the pointing part and the user's hand 300 approaches the display unit 100 closer than a predetermined threshold, a motion command corresponding to a function of selecting a predetermined object displayed on the display unit 100 can be generated.

FIGS. 7 to 21 illustrate a method for detecting a motion command in detail. In what follows, descriptions about those parts already described above will be omitted. In what follows, it is assumed that the pointing part is the user's hand 300.

Detection of a motion command can be regarded as detecting the user's gesture. Detection of a motion command can also be regarded as detecting a motion of a pointing part.

Figure 7:
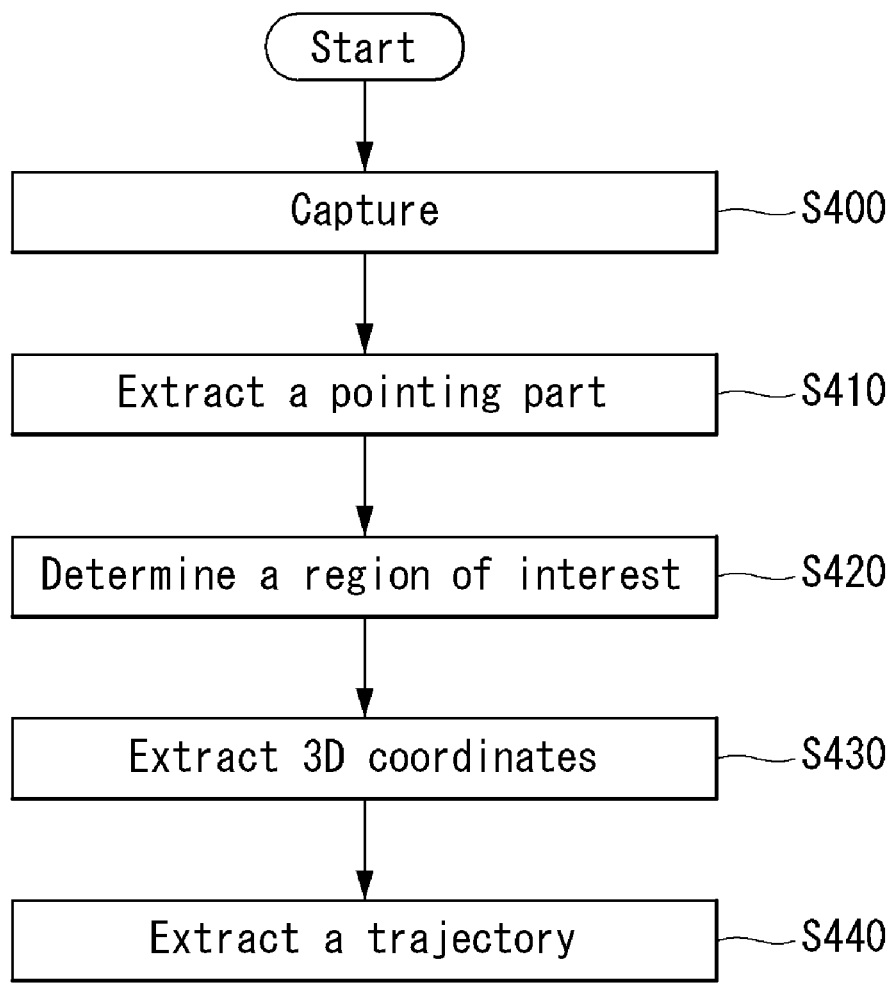

Referring to FIG. 7, a camera can capture the image of a subject S400.

Figure 8:
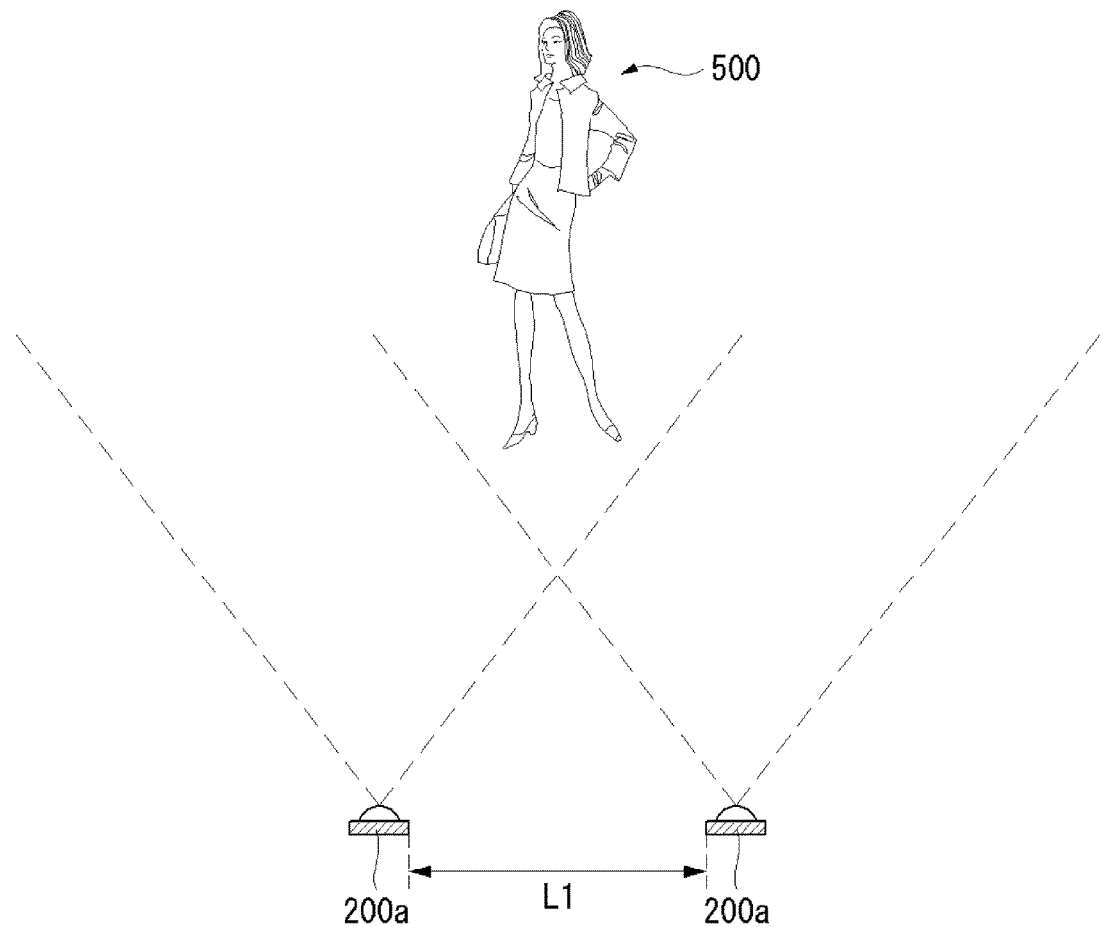
Figure 9:
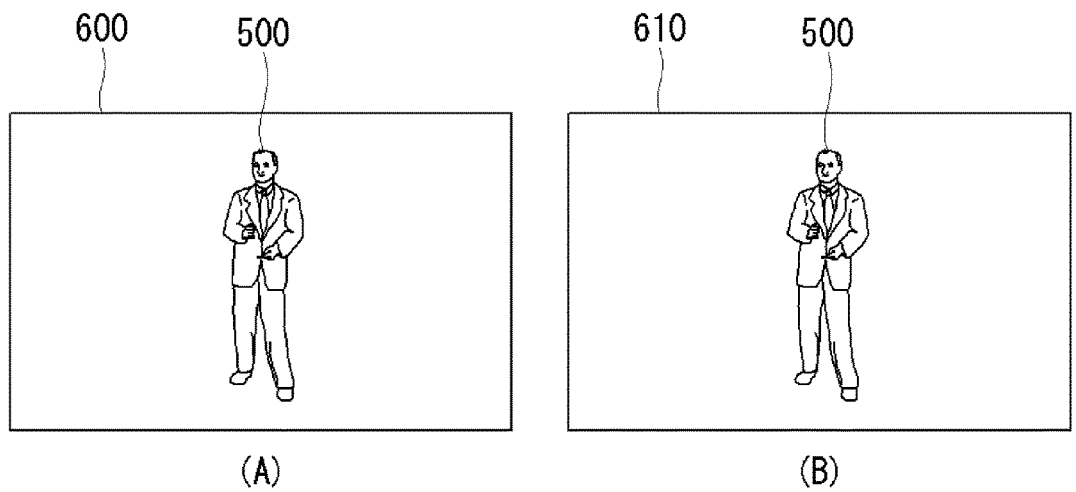

To detect the motion of the pointing part, as shown in FIG. 8, a first camera 200a and a second camera 200b spatially disposed from each other by a predetermined distance L1 can capture an image of a subject, for example, an image of the user 500. At this time, the first camera 200a and the second camera 200b can be included in the motion sensing part 192Q described above.

In what follows, an image captured by the first camera 200a is called a first image while an image captured by the second camera 200b is called a second image.

FIG. 9(A) shows a first image 600 captured by the first camera 200a, and FIG. 9(B) shows a second image 610 captured by the second camera 200b.

At a first glance, the first image 600 and the second image 610 may look the same, but they can be different from each other.

Figure 10:
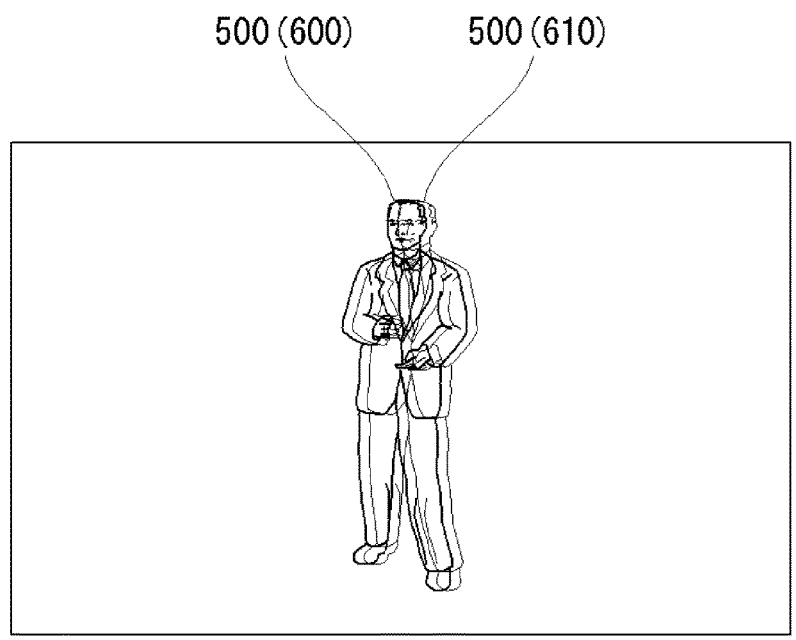
Figure 11:
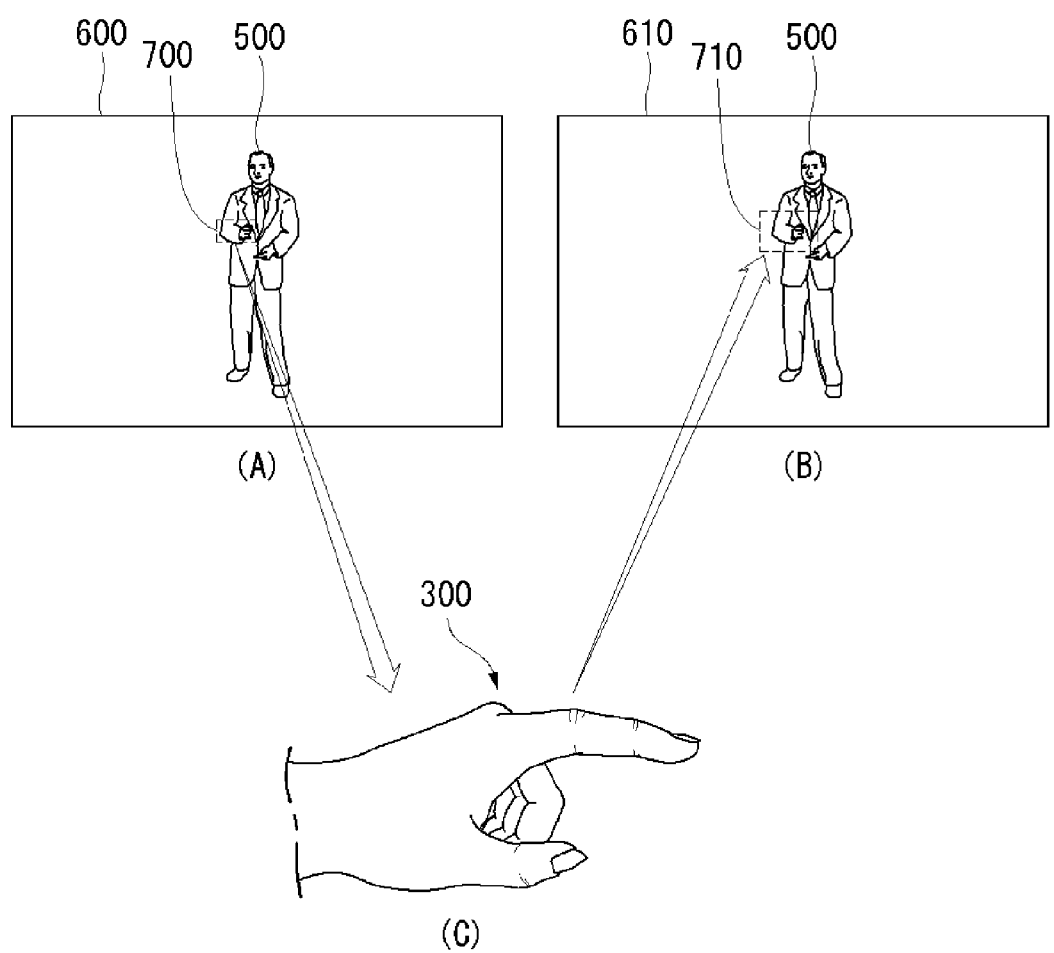

For example, if the first 600 and the second image 610 are superimposed on each other, as shown in FIG. 10, the position of the user 500 on the first image 600 can be different slightly from that on the second image 610.

As shown in FIG. 8, the disparity above can be generated since the imaging position of the first camera 200a with respect to the user 500 differs from that of the second camera 200b.

After image capture S400, the pointing part can be detected from either of the first 600 and the second image 610.

For example, as shown in FIG. 11(A), the pointing part, for example, the hand 300 of the user 500 can be detected from either of the first 600 and the second image 610. More specifically, the controller 170Q of the display device 10 can detect the hand 300 of the user 500 by comparing the first image 600 with the information about the hand stored in the memory and detecting the part corresponding to the pre-stored information from the first image 600.

In FIG. 11(A), the user (500)'s hand 300 can belong to the part denoted by the symbol 700. In what follows, the area of the symbol 700 is called a first area.

As described above, in the step of extracting the pointing part on the first image 600, image plane coordinates of the pointing part on the first image 600 can be extracted. In what follows, the plane coordinates extracted from the first image 600 are called first plane coordinates.

For example, as shown in FIG. 12(A), x-axis coordinates (Xa-Xb) and y-axis coordinates (Ya-Yb) of the first area 700 including the user (500)'s hand 300 can be extracted.

Also, as shown in FIG. 11(B), the pointing part extracted from the first image 600, namely, a region of interest including the user (500)'s hand 300 can be determined on the second image 610, S420.

As described above, in the step of determining the region of interest 710 on the second image 610, image plane coordinates of the pointing part in the region of interest 710 can be extracted. In what follows, the plane coordinates extracted from the second image 610 are called second plane coordinates.

For example, as shown in FIG. 12(B), x-axis coordinates ranging from Xc to Xd and y-axis coordinates ranging from Yc to Yd of the region of interest including the user (500)'s hand 300 can be extracted.

FIGS. 12(A) and (B) provide examples of extracting plane coordinates of the first region 700 and the region of interest 710 including the user (500)'s hand 300, respectively; however, it is also possible to extract plane coordinates of the user (500)'s hand 300 within the first region 700 and plane coordinates of the user (500)'s hand 300 within the region of interest 710.

The region of interest 710 can be determined based on the pointing part extracted from the first image 600, namely, coordinates of the user (500)'s hand 300, in other words, first plane coordinates.

Since the second image 610 is captured by the second camera 200b, and the first image 610 is captured by the first camera 200a, the coordinates of the hand 300 within the second image 610 can differ from the coordinates of the hand 300 within the first image 600.

Accordingly, in order to make the hand 300 to belong to the region of interest 710 of the second image 610, it may be preferable that the size of the region of interest 710 in the second image 610 is larger than the pointing part in the first image 600, namely, the size of a region occupied by the hand 300.

For example, as shown in FIG. 13, suppose the x-axis coordinates of the first region 700 including the hand 300 in the first image 600 range from Xa to Xb, while the y-axis coordinates range from Ya to Yb. Then the x-axis coordinates of the region of interest 710 including the hand 300 in the second image 610 range from Xc to Xd, and contain the coordinates in the range of Xa to Xb, while the y-axis coordinates range from Yc to Yd, and contain the coordinates in the range of Ya to Yb.

As described above, the size of the region of interest 710 can be larger than that of the first region 700.

In the example above, it is assumed that the first region 700 is an arbitrary region including the hand 300 on the first image 600; however, the first region 700 can be the part of the first image 600 occupied by the hand 300.

Meanwhile, after the region of interest 710 is extracted from the second image 610, the pointing part included in the region of interest 710, for example, stereoscopic coordinates of the hand 300 can be extracted S430.

To be specific, by using the spatial distance L1 between the first 200a and the second camera 200b; and the difference between the first plane coordinates and the second plane coordinates, stereoscopic coordinates can be extracted.

To be more specific, the first plane coordinates can include the pointing part in the first image 600, namely, coordinates of a central point of the user (500)'s hand (300), while the second plane coordinates can include coordinates of a central point of the pointing part in the second image 610. At this time, the coordinates of a central point of the user (500)'s hand 300 in the first image are called first central point coordinates, while the coordinates of a central point of the user (500)'s hand in the second image are called second central point coordinates.

Also, in the step of extracting stereoscopic coordinates, stereoscopic coordinates about a central point of the pointing part can be extracted by using the spatial distance L1 between the first 200a and the second camera 200b; and the difference between the first and the second central point coordinates.

For example, as shown in FIG. 14(A), the plane coordinates of a central point of the user (500)'s hand 300, namely, first central point coordinates (Xc1, Yc1) are extracted from the first image 600, and as shown in FIG. 14(B), the plane coordinates of a central point of the user (500)'s hand 300, namely, second central point coordinates (Xc2, Yc2) are extracted from the second image 610. In this case, Yc1 and Yc2 can be the same coordinate values.

Figure 15:
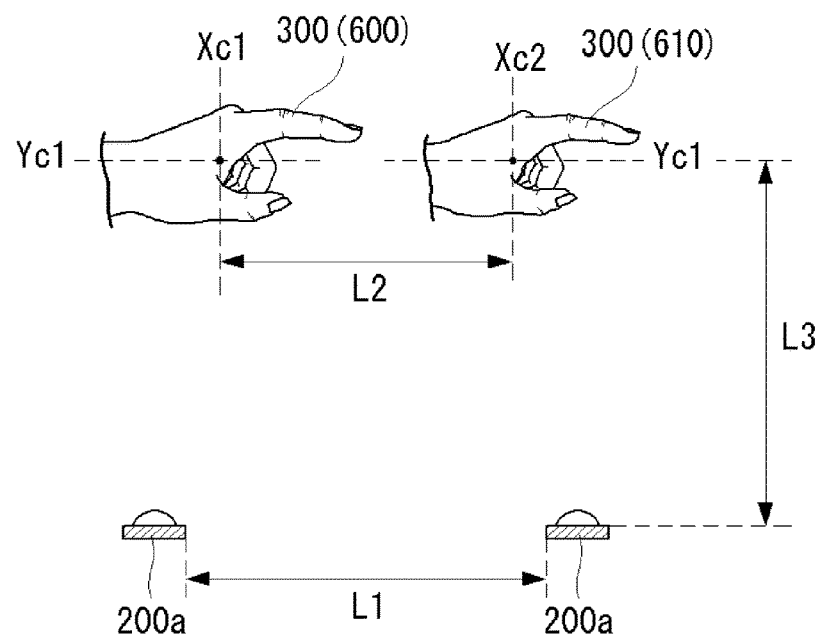

Referring to FIG. 15, now that the spatial distance L1 between the first 200a and the second camera 200b is known, the difference between the first (Xc1, Yc1) and the second central point coordinates (Xc2, Yc2), for example, the disparity L2 between the x-axis coordinates of the first (Xc1, Yc1) and the second central point coordinates (Xc2, Yc2) can be extracted.

Then by using the ratio of the spatial distance L1 between the first 200a and the second camera 200b to the disparity L2 between the x-axis coordinates of the first (Xc1, Yc1) and the second central point coordinates (Xc2, Yc2), the distance L3 between the user 500 and the first 200a and the second camera 200b can be extracted.

When the distance L3 between the user 500 and the first 200a and the second camera 200b is extracted, viewing angles of the first 200a and the second camera 200b can be taken into account.

If the user 500 approaches the first 200a and the second camera 200b, the disparity L2 between x-axis coordinates of the first (Xc1, Yc1) and the second central point coordinates (Xc2, Yc2) becomes larger; on the other hand, if the user 500 gets further away from the first 200a and the second camera 200b, the disparity L2 between x-axis coordinates of the first (Xc1, Yc1) and the second central point coordinates (Xc2, Yc2) becomes relatively small.

In this way, if the distance L3 between the user 500 and the first 200a and the second camera 200b is extracted while the first central point coordinates (Xc1, Yc1) of the user (500)'s hand 300 in the first image 600 and the second central point coordinates (Xc2, Yc2) of the user (500)'s hand 300 in the second image 610 are known, the stereoscopic coordinates of the user (500)'s hand 300 can be obtained.

For example, in the case of FIG. 15, the stereoscopic coordinates of the central point of the user (500)'s hand 300 can be determined approximately as ((Xc1+Xc2)/2, Yc1 (or Yc2), L3).

Figure 16:
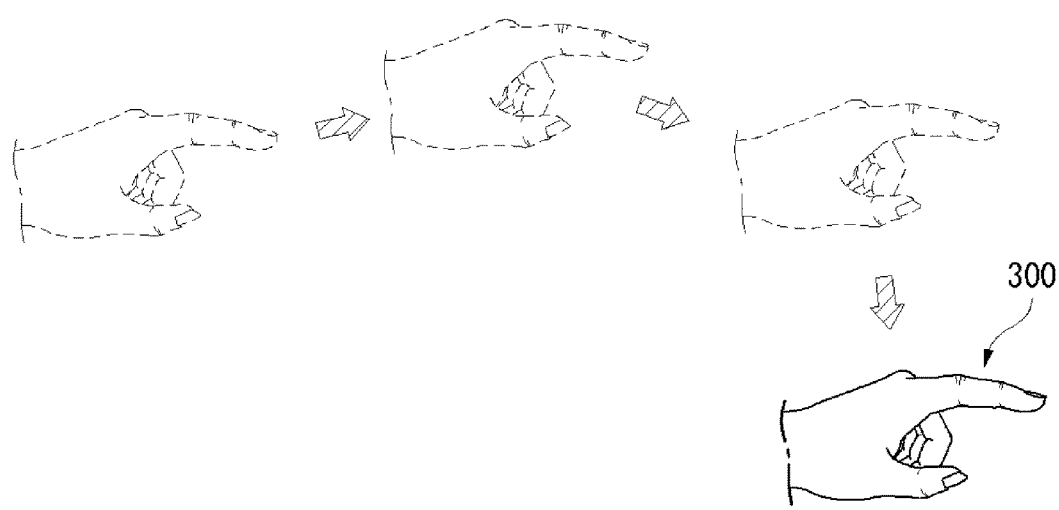

If the stereoscopic coordinates of the central point of the user (500)'s hand 300 are extracted continuously according to the method described above, the trajectory of the user (500)'s hand 300 can be extracted S440, as shown in FIG. 16.

As described above, if the trajectory of the user (500)'s hand 300 is extracted, a motion of the user (500)'s hand 300 can be eventually extracted and a motion command can be detected accordingly.

The example above describes a method for extracting a trajectory by using the central point of the user (500)'s hand 300, but the present invention is not limited to the example above.

Figure 17:
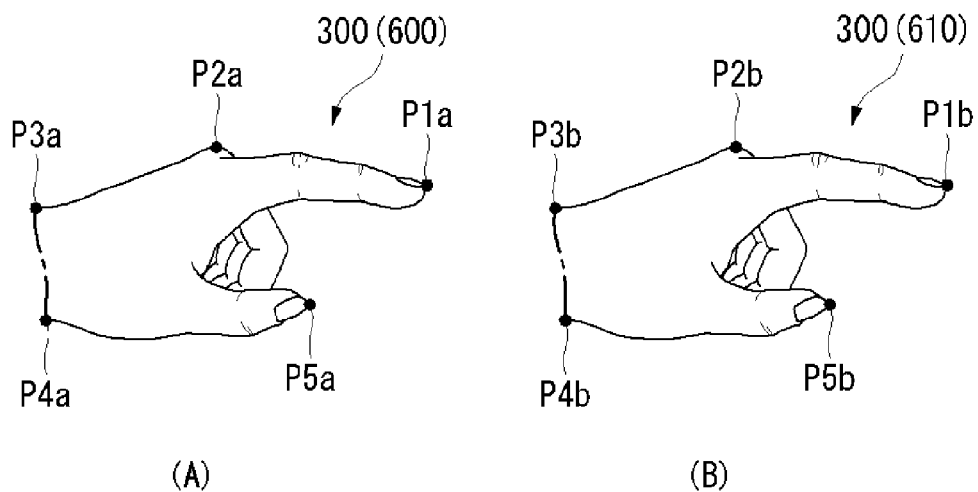

For example, as shown in FIG. 17, first to fifth part P1a-P5a of the hand 300 can be selected in the first image 600, and sixth to tenth part P1b-P5b of the hand 300 corresponding to the first to fifth part P1a-P5a can be selected in the second image 610.

At this time, the first part P1a can correspond to the sixth part P1b, the second part P2a to the seventh part P2b, the third part P3a to the eighth part P3b, the fourth part P4a to the ninth part P4b, and the fifth part P5a to the tenth part P5b.

In this way, by extracting stereoscopic coordinates of a plurality of parts selected from the hand 300, the trajectory of the hand 300 can be extracted.

In the examples above, for the convenience of description, it has been assumed that a pointing part is detected in the first image 600 and a region of interest including the pointing part is determined in the second image 610. However, the present invention is not limited to the assumption above. For example, a pointing part can be extracted from the second image 610, and a region of interest including the pointing part can be determined in the first image 600.

Differently from the above, described will be a method for extracting a motion trajectory of a pointing part by using a depth map from the first 600 and the second image 610.

Figure 18:
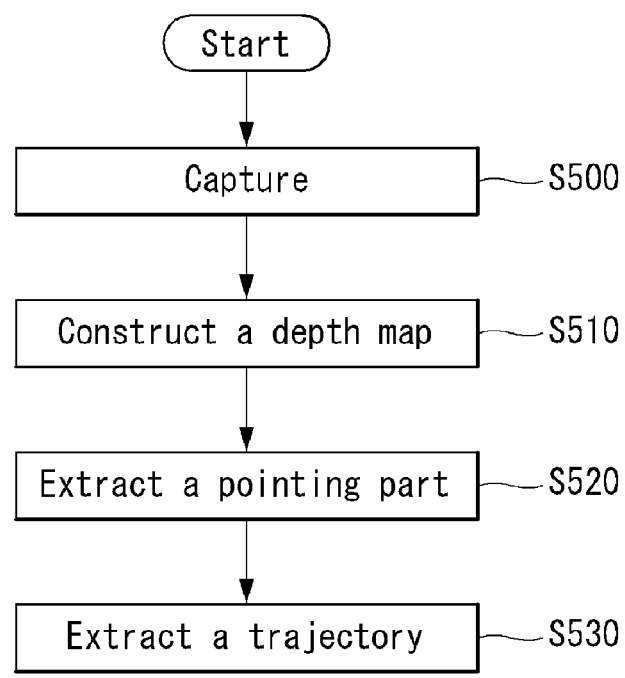

Referring to FIG. 18, a first camera 200a and a second camera 200b can capture a first 600 and a second image 610.

Afterwards, a depth map can be constructed by using the first image 600 and the second image 610, S510.

At this time, a depth map is constructed based on disparities between the first 600 and the second image 610 for all the pixel positions. Depth map is a well-known method in the field of stereopsis, of which detailed descriptions will be omitted.

Now, a predetermined pointing part can be extracted from a constructed depth map.

Next, by extracting the pointing part from depth maps constructed continuously, the trajectory of the pointing part can be detected eventually.

Using a depth map to extract a pointing part may require an additional computing chip since construction of the depth map consists of a series of complicated computational processes.

In case an additional computing chip is not used, a considerable part of a processor's resources has to be dedicated to construct a depth map, and a program for managing the depth map may also become considerably heavy.

On the other hand, if a pointing part is extracted in the first image 600, a region of interest corresponding to the pointing part is then determined in the second image 610, and a method for extracting stereoscopic coordinates of the pointing part with respect to the region of interest is finally used, manufacturing costs can be reduced since there will be no need to add a computing chip.

Moreover, since a depth map of a full-scale image size is not required, computational processes can be carried out in a relatively simple manner.

Meanwhile, according to the present invention, a region of interest including the pointing part can be determined for each of the first 600 and the second image 610, a depth map can be constructed based on the regions of interest to extract a motion trajectory of the pointing part. In what follows, this scheme is described.

Figure 19:
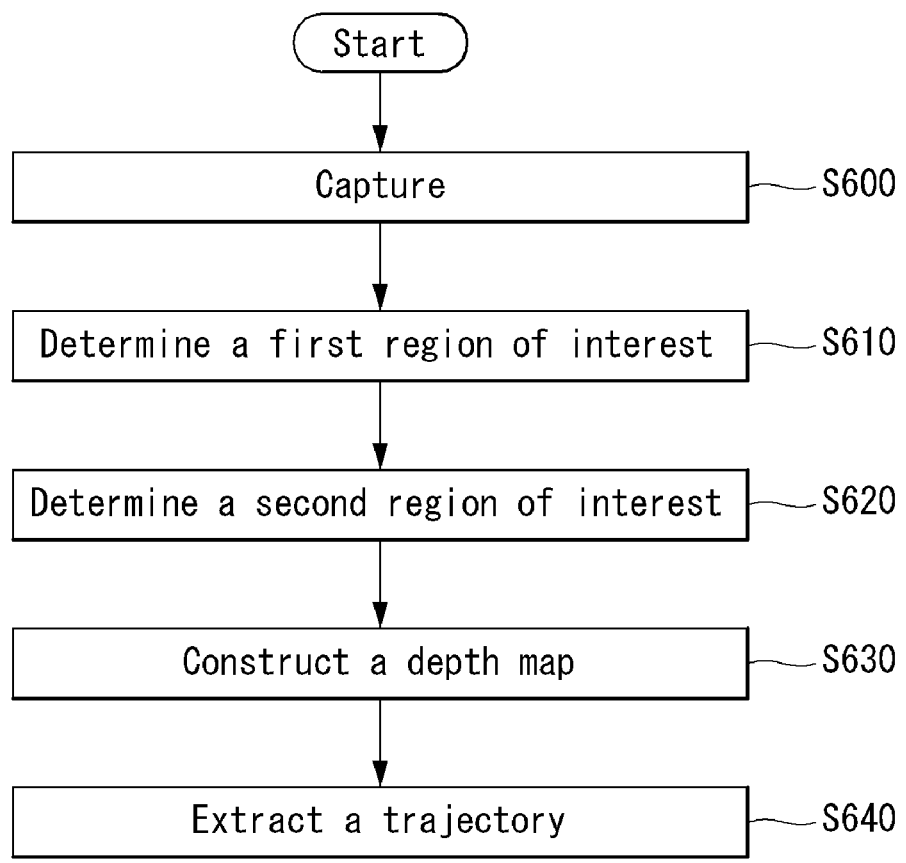

Referring to FIG. 19, an image of a subject, for example, an image of the user 500 can be captured S600 by using a first 200a and a second camera 200b disposed spatially separated from each other by a predetermined distance L1.

Afterwards, a pointing part, for example, a first region of interest including the user (500)'s hand 300 can be determined S610 from the first image 600 captured by the first camera 200a.

Also, a pointing part, for example, a second region of interest including the user (500)'s hand 300 can be determined S620 from the second image 610 captured by the second camera 200b.

For example, as shown in FIG. 20(A), a pointing part, namely, the user (500)'s hand 300 can be extracted from the first image 600.

At this time, the controller 170Q of the display device 10 can compare the information about the hand stored in a memory with the first image 600 and extract the user (500)'s hand 300 by using a method for extracting a part corresponding to pre-stored information from the first image 600.

Afterwards, a first region of interest 800 can be determined so that the hand 300 can be included therein.

As in the case of FIG. 20(B), the pointing part extracted from the first image 600, namely, the second region of interest 810 including the user (500)'s hand 300 can be determined in the second image 610.

Figure 21:
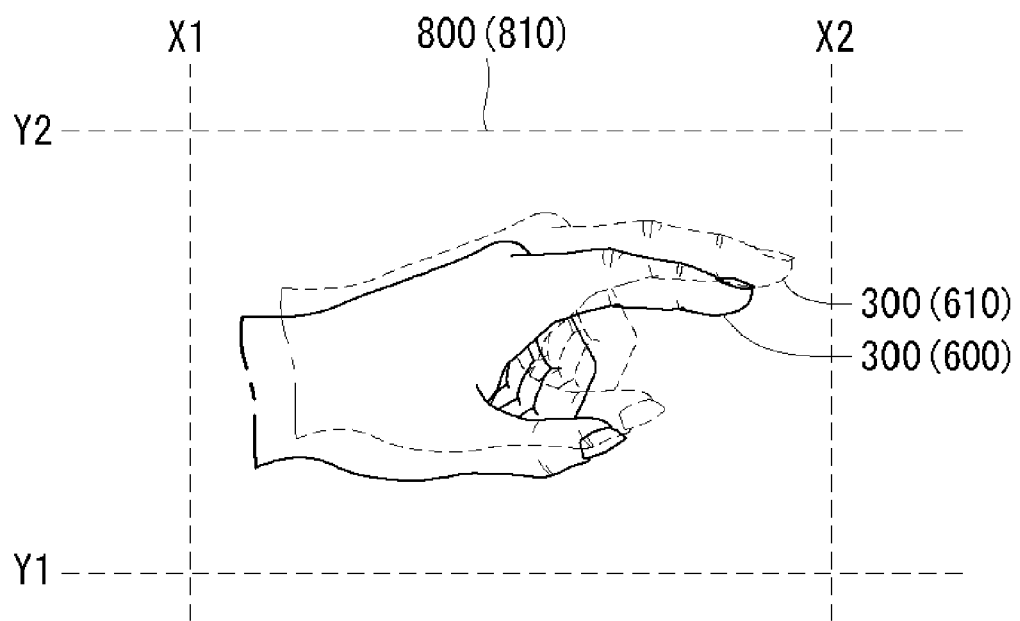

At this time, as shown in FIG. 21, the size of the first region of interest 800 can be the same as that of the second region of interest 810. Preferably, the plane coordinates of the first region of interest 800 can be the same as those of the second region of interest 810.

For example, in case x-axis coordinates of the first region of interest 800 on the first image 600 range from X1 to X2 and y-axis coordinates range from Y1 to Y2, the x-axis coordinates of the first region of interest 800 on the second image 610 can range from X1 to X2 and y-axis coordinates can range from Y1 to Y2.

The reason why the size of the first region of interest 800 is kept to be the same as that of the second region of interest 810 is to construct a depth map based on the first 800 and the second region of interest 810.

Afterwards, a depth map can be constructed based on the first 800 and the second region of interest 810, S630.

To be specific, image data of the first region of interest 800 are compared with the image data of the second region of interest 810, and a depth map is constructed, which includes information about distance of the predetermined part in the first region of interest 800, namely, the hand 300 and information about distance of the hand 300 in the second region of interest 810.

Next, a motion trajectory of the pointing part can be extracted by using depth maps constructed continuously S640.

As described above, in case the first 800 and the second region of interest 810 are used to construct a depth map, as shown in FIG. 18, a motion trajectory of the pointing part can be extracted by constructing a depth map of a relatively small size compared with a method based on a depth map of a full-scale image size utilizing the first 600 and the second image 610. Accordingly, computational processes involved can be made to be relatively simple.

Though the present invention has been described with reference to a limited number of embodiments and drawings, the present invention is not limited to the embodiments, and it should be understood that various modifications and changes can be implemented from the descriptions by those skilled in the art.

Therefore, the technical scope of the present invention should not be limited to the embodiments of this document, but it should be defined by the appended claims or equivalents of the appended claims.

The invention claimed is:

1. A remote pointing method, comprising:
    capturing images by a first and a second camera disposed being separated spatially from each other;
    detecting a pointing part in a first image captured by the first camera and first plane coordinates of the pointing part in the first image;

determining a region of interest including the pointing part in a second image captured by the second camera and second plane coordinates of the pointing part; and extracting stereoscopic coordinates of the pointing part within a region of interest by using a disparity between the first plane coordinates and the second plane coordinates, wherein the first plane coordinates include coordinates of a first central point of the pointing part in the first image, and the second plane coordinates include coordinates of a second central point of the pointing part, and the extracting stereoscopic coordinates detects stereoscopic coordinates about the central point of the pointing part by using a disparity between the first central coordinates and the second central coordinates.

2. The method of claim 1, further comprising
tracking a movement trajectory of the pointing part by using the stereoscopic coordinates.

3. The method of claim 1, wherein a size of the region of interest in the second image is larger than a size of the region occupied by the pointing part in the first image.

4. A remote pointing method, comprising:
capturing images by a first and a second camera disposed being separated spatially from each other;
determining a first region of interest including a pointing part in a first image captured by the first camera;
determining a second region of interest including the pointing part in a second image captured by the second camera and corresponding to the first region of interest;
extracting a depth map by using the first and the second region of interest; and
tracking a movement trajectory of the pointing part in the depth map,
wherein a size of the first region of interest is the same as a size of the second region of interest.

* * * * *